US011665560B2

(12) United States Patent
Briggs

(10) Patent No.: US 11,665,560 B2
(45) Date of Patent: *May 30, 2023

(54) AUTOMATED NETWORK VOICE TESTING PLATFORM

(71) Applicant: Verizon Patent and Licensing Inc., Basking Ridge, NJ (US)

(72) Inventor: Charles David Briggs, Wailuku, HI (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 97 days.

This patent is subject to a terminal disclaimer.

(21) Appl. No.: 17/248,509

(22) Filed: Jan. 28, 2021

(65) Prior Publication Data

US 2021/0153042 A1     May 20, 2021

Related U.S. Application Data

(63) Continuation of application No. 16/781,367, filed on Feb. 4, 2020, now Pat. No. 10,924,946, which is a continuation of application No. 16/181,981, filed on Nov. 6, 2018, now Pat. No. 10,575,197.

(51) Int. Cl.
| | |
|---|---|
| *H04W 24/06* | (2009.01) |
| *H04L 43/50* | (2022.01) |
| *H04W 24/04* | (2009.01) |
| *H04L 41/0659* | (2022.01) |
| *H04L 69/08* | (2022.01) |

(Continued)

(52) U.S. Cl.
CPC ......... *H04W 24/06* (2013.01); *H04L 41/0659* (2013.01); *H04L 41/0686* (2013.01); *H04L 43/06* (2013.01); *H04L 43/50* (2013.01); *H04L 69/08* (2013.01); *H04W 24/04* (2013.01)

(58) Field of Classification Search
CPC ..... H04W 24/06; H04L 43/50; H04L 41/0659
See application file for complete search history.

(56) References Cited

U.S. PATENT DOCUMENTS

| | | | |
|---|---|---|---|
| 10,575,197 B1 | 2/2020 | Briggs | |
| 2008/0049640 A1* | 2/2008 | Heinz | H04L 43/06 370/252 |
| 2011/0202645 A1 | 8/2011 | Abdelal et al. | |

(Continued)

*Primary Examiner* — Jamal Javaid
*Assistant Examiner* — Ryan C Kavleski

(57) ABSTRACT

A device initiates voice communication sessions with a media resource function processor (MRFP) of a network, where each voice communication session communicates audio data via one or more network devices of the network. For each voice communication session, the device sends first audio data to the MRFP and receives second audio data from the MRFP via the voice communication session, processes the first audio data and second audio data to determine one or more characteristics of the second audio data, and generates a record concerning the voice communication session based on the one or more characteristics of the second audio data. The device generates a report based on a respective record of each voice communication session, processes the report using an artificial intelligence technique to identify an issue concerning at least one network device, and performs, based on identifying the issue, an action concerning the at least one network device.

20 Claims, 7 Drawing Sheets

(51) Int. Cl.
*H04L 41/0686* (2022.01)
*H04L 43/06* (2022.01)

(56) References Cited

U.S. PATENT DOCUMENTS

| | | | |
|---|---|---|---|
| 2015/0334716 A1* | 11/2015 | Coffman | H04W 72/10 |
| | | | 370/237 |
| 2016/0134864 A1* | 5/2016 | Regev | H04L 43/12 |
| | | | 348/192 |
| 2017/0206906 A1* | 7/2017 | Jung | H04L 65/762 |
| 2018/0197544 A1 | 7/2018 | Brooksby et al. | |
| 2019/0141538 A1 | 5/2019 | Jones | |
| 2019/0231233 A1 | 8/2019 | Turner et al. | |
| 2019/0306306 A1* | 10/2019 | Makagon | G06N 20/00 |

\* cited by examiner

AUTOMATED NETWORK VOICE TESTING PLATFORM

RELATED APPLICATIONS

This application is a continuation of U.S. patent application Ser. No. 16/781,367, entitled "AUTOMATED NETWORK VOICE TESTING PLATFORM," filed Feb. 4, 2020 (now U.S. Pat. No. 10,924,946), which is a continuation of U.S. patent application Ser. No. 16/181,981, entitled "AUTOMATED NETWORK VOICE TESTING PLATFORM" filed Nov. 6, 2018 (now U.S. Pat. No. 10,575,197), which are incorporated herein by reference.

BACKGROUND

A voice communication session communicates audio data through a network, such as a Long-Term Evolution (LTE) network. The voice communication session communicates the audio data via one or more network devices of the network.

DETAILED DESCRIPTION OF PREFERRED EMBODIMENTS

Figure 1A:
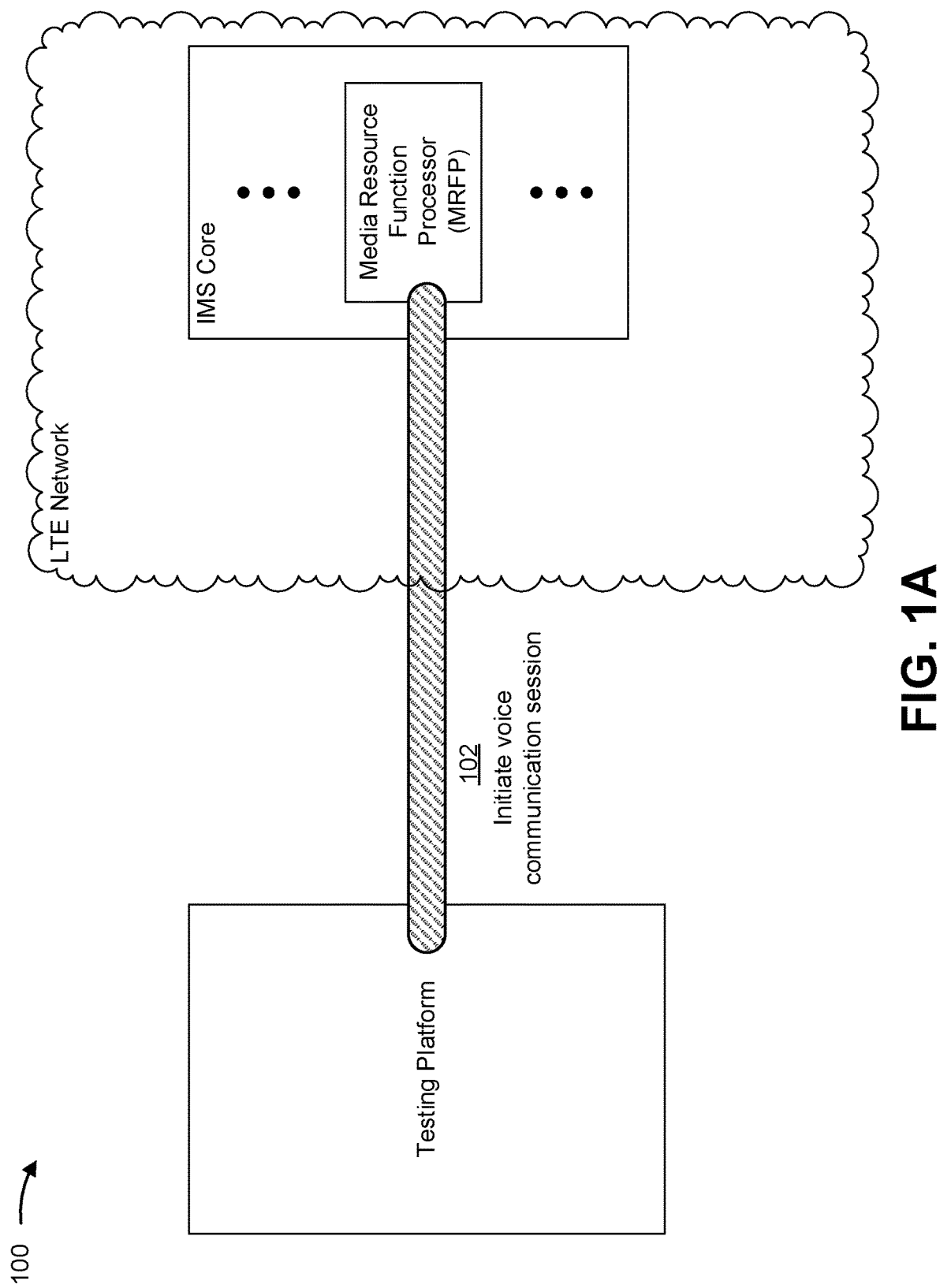
FIGS. 1A-1C are diagrams of an example implementation described herein.

The following detailed description of example implementations refers to the accompanying drawings. The same reference numbers in different drawings can identify the same or similar elements.

A network, such as an LTE network, processes millions of voice communication sessions per hour. A voice communication session communicates audio data between two or more user devices. In some cases, a particular network device, of a plurality of network devices of the network, does not function properly and cannot facilitate the communication of audio data via the voice communication session. In such a case, unless the failure affects a large volume of voice communication sessions, current network diagnostic tools cannot identify an issue with the particular network device. Moreover, in order to maintain the privacy of users of the network, network monitoring tools typically do not monitor audio quality of the voice communication sessions. Accordingly, network administrators must rely on users' complaints and/or feedback to address issues concerning the quality of voice communication sessions.

Some implementations described herein provide a testing platform that is capable of testing one or more network devices of a network. In some implementations, the testing platform can initiate a plurality of communication sessions with a media resource function processor (MRFP) of a network. According to some implementations, for each voice communication session of the plurality of voice communication sessions, the testing platform can send first audio data to the MRFP and receive second audio data from the MRFP. In some implementations, the testing platform can process the first audio data and the second audio data to determine one or more characteristics of the second audio data to generate a record concerning the voice communication session. According to some implementations, the testing platform can generate a report based on a respective record of each voice communication session of the plurality of voice communication sessions. In some implementations, the testing platform can process the report to identify an issue concerning at least one network device of the one or more network devices, such as the at least one network device malfunctioning, occasionally not performing correctly, performing slowly, and/or the like. In some implementations, the testing platform can perform an action to address the issue concerning the at least one network device.

In this way, some implementations described herein can automatically identify an issue concerning at least one network device of a network and automatically perform a corrective action to address the issue. This conserves resources of the network that would otherwise be used to compensate for a malfunctioning network device, reduces the amount of time a technician would have to spend identifying, diagnosing, and/or repairing the malfunctioning network device, and reduces costs associated with maintaining the network. Moreover, regularly testing network devices of the network can decrease a mean time to detect (MTTD) a network device issue, which would take longer to detect using traditional monitoring functions (e.g., such as receiving communications from users regarding voice communication session quality issues). This can result in more efficient operation of the network and/or a better user experience for users utilizing the network.

Moreover, some implementations described herein, can automatically identify an issue concerning at least one network device of a production network during peak usage hours, rather than a production network during a maintenance window (e.g., during non-peak usage hours). In this way, the production network can be tested under a normal user load to emulate real-world user experiences. In this way, the testing platform can identify issues (e.g., high processor utilization issues, network transport congestion issues, and/or the like) that would not be identified on the production network during a maintenance window with a lower volume of voice communication sessions. Further, some implementations can take a "do no harm" approach to testing the production network, such that the testing platform limits (e.g., by implementing physical limitations and software safeguards) the number of voice communication sessions that the testing platform can initiate over a period of time. For example, the facilitation platform can limit the number of test voice communication sessions (e.g., only 120 thousand test communications sessions per hour) so as to only be a fraction of the number of production communication sessions over the period of time (e.g., 25 million production communication sessions per hour), which can prevent the testing platform from detrimentally impacting the functionality of the production network during testing.

Furthermore, the process for identifying or determining an issue concerning a network device is automated, and the testing platform can identify or determine numerous (e.g., hundreds, thousands, millions, and/or the like) issues at roughly the same time. This improves speed and efficiency of the process and conserves computing resources (e.g., processor resources, memory resources, power resources, and/or the like) of the testing platform and/or network. Furthermore, implementations described herein use a rigorous, computerized process to perform tasks or roles that were not previously performed or were previously performed using subjective human intuition or input. For example, currently there does not exist a technique to automatically determine and address an issue concerning a network device of a plurality of network devices based on communicating audio data via a voice communication session. Finally, automating the process for determining and addressing an issue concerning a network device of a plurality of network devices conserves computing resources (e.g., processor resources, memory resources, power resources, and/or the like) that would otherwise be wasted in attempting to assist a human in determining and addressing an issue concerning a network device of a plurality of network devices by hand.

Figure 1B:
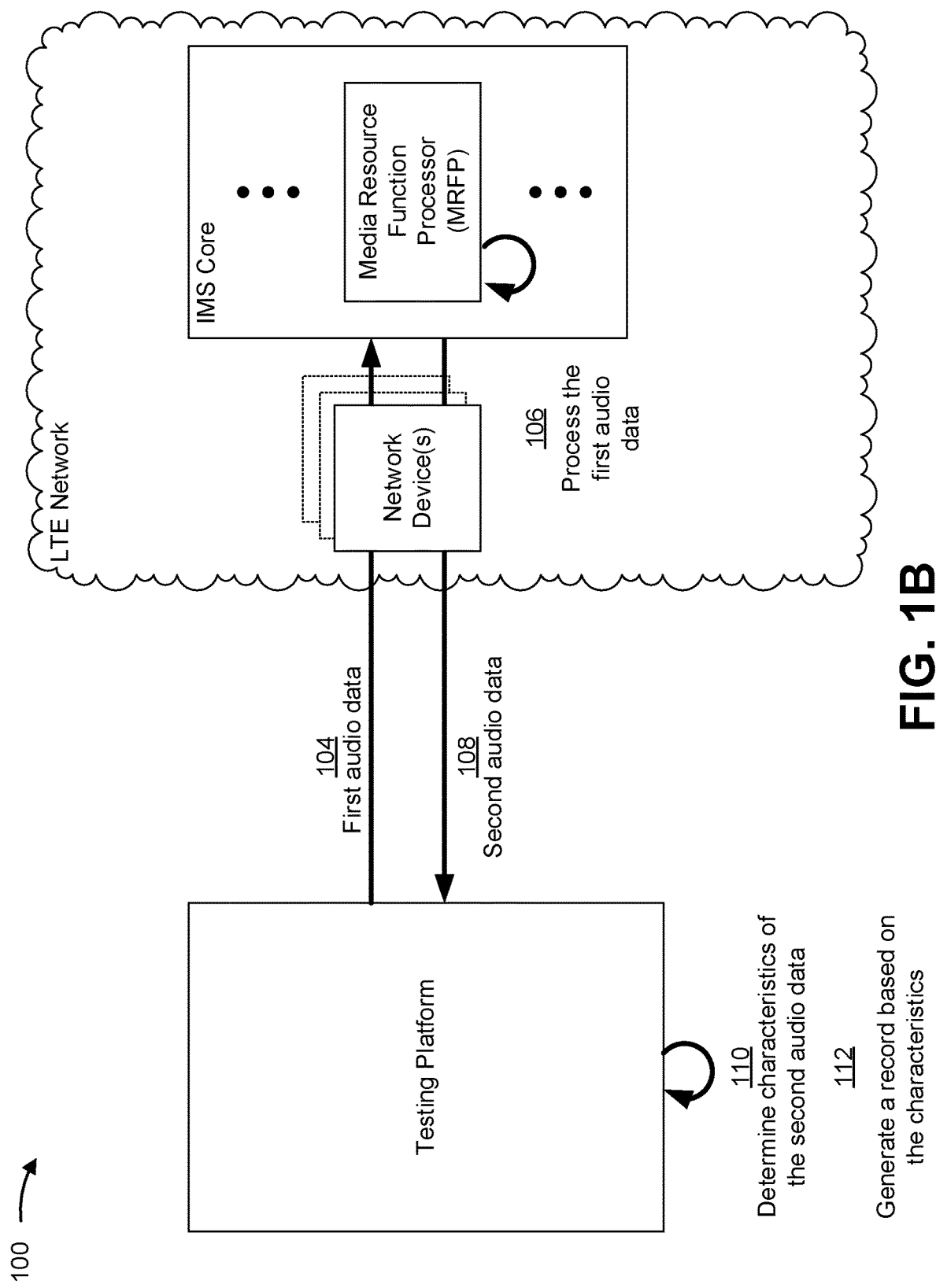
Figure 1C:
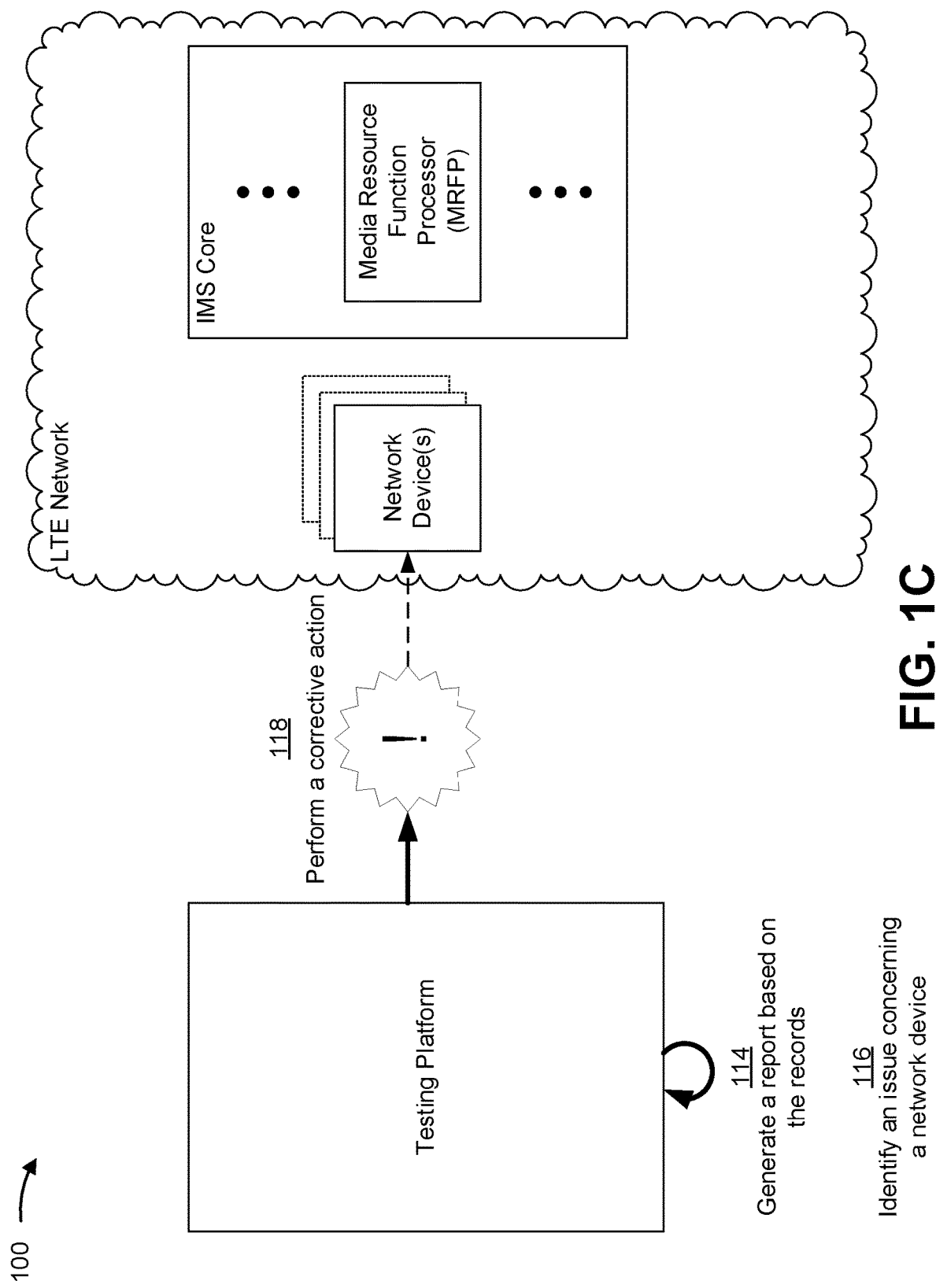

FIGS. 1A-1C are diagrams of an example implementation 100 described herein. As shown in FIGS. 1A-1C, example 100 can include a testing platform (e.g., one or more devices capable of receiving, generating, storing, processing, and/or providing audio data) and a media resource function processor (MRFP) that processes media streams, such as audio streams, and transcodes multimedia data, such as audio data. In some implementations, the MRFP can be associated with an Internet Protocol (IP) Multimedia Subsystem (IMS core) of a network, such as an IMS core of a Long-Term Evolution (LTE) network. Some example implementations described herein concern a single testing platform and/or a single MRFP, but some implementations can include a plurality of testing platforms and/or a plurality of MRFPs. For example, an LTE network can be divided into a plurality of open shortest path first (OSPF) areas, where an OSPF area can be associated with an IMS core that can have a plurality of MRFPs. Further, a plurality of testing platforms can be associated with the plurality of OSPF areas such that a particular testing platform of the plurality of testing platforms is associated with at least one particular OSPF area of the plurality of OSPF areas.

As shown in FIG. 1A and by reference number 102, the testing platform can initiate a voice communication session with the MRFP. In some implementations, the testing platform can emulate a user device and other devices of the network, such as a call session control function (CSCF), a home subscriber server (HSS), a user profile server function (UPSF), a subscription locator function (SLF), a breakout gateway control function (BGCF), a media gateway controller function (MGCF), a media gateway (MGW), a signaling gateway (SGW), and/or the like of the IMS core to initiate the voice communication session with the MRFP. In this way, the testing platform can initiate a voice communication session by directly connecting to the IMS core of the network, which enables the testing platform to connect with a particular MRFP of the IMS core, without having to connect to the network and/or the IMS core via a base station, a radio access network (RAN), an evolved packet core (EPC), and/or the like. This conserves processing resources, memory resources, and/or power resources of the testing platform, as well as resources of the network, that would otherwise be used to initiate and maintain the communication session via the base station, the RAN, the EPC, and/or the like. Some example implementations described herein concern a single testing platform initiating a single voice communication session with an MRFP, but some implementations can include a single testing platform initiating a plurality of voice communication sessions with the MRFP, initiating a plurality of voice communication sessions with a plurality of MRFPs, and/or the like. Further, some implementations can include a plurality of testing platforms initiating a plurality of voice communication sessions with a plurality of MRFPs and/or the like.

In some implementations, a voice communication session can communicate audio data between the testing platform and the MRFP. In some implementations, the voice communication session can communicate the audio data via one or more network devices of the network, such as routers, firewalls, gateways, servers, base stations, access points, and/or the like. In some implementations, the audio data can include voice data, such as human speech.

In some implementations, the testing platform can initiate the voice communication session with the MRFP by sending a session initiation protocol (SIP) message to a media resource function controller (MRFC) associated with the MRFP. In some implementations, the MRFC can cause the MRFP to establish the voice communication session with the testing platform based on the SIP message. In some implementations, the SIP message can indicate that the testing platform is a source and a destination of the voice communication session (e.g., such that the audio data is communicated from the testing platform to the testing platform via the MRFP). In some implementations, the SIP message can indicate that the voice communication session should be routed via a particular OSPF area, a particular node (e.g., a group of MRFPs and/or MRFCs), a particular MRFP and/or a particular MRFC, and/or the like.

In some implementations, the testing platform can determine a topology of the network (e.g., determine how components of the network, such as MRFPs, MRFCs, other network devices, and/or the like are connected) and determine and/or generate scripts to automatically initiate voice communication sessions to a particular OSPF area, a particular node (e.g., a group of MRFPs and/or MRFCs), a particular MRFP and/or a particular MRFC, a particular network device, and/or the like. For example, the testing platform may generate a script to automatically initiate a set of voice communication sessions to an OSPF, such that the set of voice communication sessions is created to test all MRFCs, MRFPs, and/or network devices of the OSPF. In this way, the testing platform can control which OSPF areas, nodes, MRFPs, MRFCs, and/or network devices the testing platform tests via the voice communication sessions. In some implementations, the testing platform can cause the scripts to run on a scheduled basis (e.g., every 12 hours, every day, every week, and/or the like), an on-demand basis (e.g., a network administrator instructs the testing platform to run the scripts), a triggered basis (e.g., a threshold amount of users complain about voice communication sessions in a particular OSPF area), and/or the like.

In some implementations, the testing platform can utilize one or more safeguards to prevent overloading of the MRFP, the IMS core, the network, and/or the like when initiating a plurality of voice communication sessions with an MRFP. For example, the testing platform can determine a maximum number of voice communication sessions with the MRFP that can be established in a period of time (e.g., a maximum number of voice communication sessions that can be established with the MRFP without overloading the MRFP, the IMS core, the network, and/or the like). The testing platform can limit a number of the plurality of voice communication sessions to initiate during the period of time to be less than the maximum number of voice communication sessions. As another example, the testing platform can determine a maximum bandwidth allotment for voice communication sessions with the MRFP for the period of time (e.g., a maximum amount of audio data that can be communicated with the MRFP without overloading the MRFP, the IMS core, the network, and/or the like). The testing platform can limit the number of the plurality of voice communication sessions to be initiated during the period of time such that the total bandwidth associated with the number of the plurality of voice communication sessions is less than the maximum bandwidth allotment for voice communication sessions. In some implementations, the testing platform can determine the number of the plurality of voice communication sessions to initiate during the period of time based on the maximum number of voice communication sessions and the maximum bandwidth allotment.

As shown in FIG. 1B and by reference number 104, the testing platform can send first audio data to the MRFP. In some implementations, the testing platform can send the first audio data to the MRFP via the voice communication session. In some implementations, the first audio data can include test voice data (e.g., a recording of a human speaking for a period of time, such as twenty seconds, one or more humans speaking for the period of time, one or more humans having a conversation for the period of time, and/or the like). In some implementations, the testing platform can send the first audio data to the MRFP via one or more network devices via the voice communication session. In some implementations, the one or more network devices can include a router (such as an optical transport network router), a firewall, a gateway, a server, an access point, and/or the like of the network and/or the IMS core.

As shown by reference number 106, the MRFP receives and processes the first audio data. For example, the MRFP can process the first audio data using a digital signal processor (DSP) of the MRFP. In some implementations, the MRFP can transcode and/or convert the first audio data into second audio data. For example, where the first audio data conforms to a first voice protocol, such as the Pulse Code Modulation (PCM) voice protocol (e.g., the ITU Telecommunication Standardization Sector (ITU-T) G.711 voice protocol), the MRFP can convert the first audio data into the second audio data that conforms to a second voice protocol, such as the Adaptive Multi-Rate Wideband (AMR-WB) voice protocol (e.g., the ITU-T G.722.2 voice protocol). In this way, the MRFP can function in a way that tests real-world functionality, where the MRFP has to transcode and/or convert audio data so that two different types of user devices that use different voice protocols can communicate. In some implementations, the testing platform can send an SIP conversion signal to the MRFC to cause the MRFP to convert and/or transcode the first audio data into the second audio data. In some implementations, the MRFP can transcode and/or convert the first audio data into the second audio data such that the test voice data is included in the second audio data.

As shown by reference number 108, the MRFP can send the second audio data to the testing platform. In some implementations, the second audio data can include the test voice data that was part of the first audio data. In some implementations, the MRFP can send the second audio data to the testing platform via the voice communication session. In some implementations, the MRFP can send the second audio data to the testing platform via the one or more network devices via the voice communication session. In some implementations, the testing platform can receive the second audio data from the MRFP.

As shown by reference number 110, the testing platform can determine one or more characteristics of the second audio data. In some implementations, the testing platform can process the first audio data and the second audio data to determine the one or more characteristics of the second audio data. In some implementations, the testing platform can analyze the test voice data of the second audio data to determine the one or more characteristics of the second audio data. In some implementations, the one or more characteristics of the second audio data can include a packet loss performance of the second audio data. For example, the testing platform can determine that a percentage (or number) of packets of the second audio data are missing when compared to packets of the first audio data. In some implementations, the packets of the second audio data can be empty, which can indicate a "one way audio" error (e.g., that audio data is communicated in an outgoing direction but not an incoming direction). In some implementations, the one or more characteristics of the second audio data can include: a jitter of the second audio data (e.g., a delay between the packets of the second audio data); a mean opinion score (MOS) of the second audio data (e.g., a quality rating of the second audio data); a latency of the second audio data (e.g., a delay in transmission of packets of the second audio data from the MRFP to the testing platform); a wave form deviation of the second audio data (e.g., an impact to a sample rate, frequency range, power, fidelity, and/or the like of the second audio data); and/or the like.

As shown by reference number 112, the testing platform can generate a record concerning the voice communication session based on the one or more characteristics of the second audio data. In some implementations, the record can include information concerning the one or more characteristics of the second audio data. Some example implementations described herein concern a single testing platform generating a single record, but some implementations can include a single testing platform generating a plurality of records concerning a plurality of voice communication sessions, a plurality of testing platforms generating a plurality of records concerning a plurality of voice communication sessions, and/or the like.

As shown in FIG. 1C and by reference number 114, the testing platform can generate a report based on the plurality of records concerning the plurality of voice communication sessions. In some implementations, the testing platform can generate the report based on a respective record of each voice communication session of the plurality of voice communication sessions. In some implementations, the testing platform can compile the plurality of records into the report.

As shown by reference number 116, the testing platform can determine and/or identify one or more issues concerning an MRFP, an MRFC, one or more network devices and/or the like. In some implementations, the testing platform can process the report using an artificial intelligence technique to determine and/or identify the issue concerning the MRFP, the MRFC, at least one network device, and/or the like. For example, the testing platform can identify a set of bad voice communication sessions, determine a set of MRFPs, MRFCs, network devices, and/or the like associated with the set of bad voice communication sessions, and use the artificial intelligence technique to determine that a particular MRFP, MRFC, network device, and/or the like has an associated issue. In some implementations, the testing platform can utilize a machine learning model to determine and/or identify the issue concerning the MRFP, the MRFC, the at least one network device, and/or the like.

In some implementations, the testing platform can generate, train, retrain, update, and/or the like the machine learning model using a machine learning technique. For example, the testing platform can process historical records from historical reports to generate and/or train a machine learning model. In some implementations, the testing platform can process the historical records to train the machine learning model to determine and/or identify an issue concerning an MRFP, an MRFC, at least one network device, and/or the like.

In some implementations, the testing platform can perform a set of data manipulation procedures to process the historical records to generate the machine learning model. Examples of data manipulation procedures include: a data preprocessing procedure, a model training procedure, a model verification procedure, and/or the like. For example, the testing platform can preprocess the historical records to remove numbers and/or letters, non-ASCII characters, other special characters, white spaces, confidential data, and/or the like. In this way, the testing platform can organize thousands, millions, or billions of data entries for machine learning and model generation—a data set that cannot be processed objectively by a human actor.

In some implementations, the testing platform can perform a training operation when generating the machine learning model. For example, the testing platform can portion the historical records into a training set, a validation set, a test set, and/or the like. In some implementations, the testing platform can train the machine learning model using, for example, an unsupervised training procedure and based on the training set of the data. In some implementations, the testing platform can further train the machine learning model using the validation set and test the machine learning model using the test set. In some implementations, the testing platform can perform dimensionality reduction to reduce the historical records to a minimum feature set, thereby reducing processing to train the machine learning model, and can apply a classification technique to the minimum feature set.

In some implementations, the testing platform can use a logistic regression classification technique to determine a categorical outcome (e.g., that particular historical records are associated with particular issues). Additionally, or alternatively, the testing platform can use a naïve Bayesian classifier technique. For example, the testing platform can perform binary recursive partitioning to split the data of the minimum feature set into partitions and/or branches, and use the partitions and/or branches to perform predictions (e.g., that particular historical records are associated with particular issues). Based on using recursive partitioning, the testing platform can reduce utilization of computing resources relative to manual, linear sorting and analysis of data points, thereby enabling use of thousands, millions, or billions of data points to train the machine learning model, which can result in a more accurate machine learning model than using fewer data points.

Additionally, or alternatively, the testing platform can use a support vector machine (SVM) classifier technique to generate a non-linear boundary between data points in the training set. In this case, the non-linear boundary is used to classify test data (e.g., particular historical records) into a particular class (e.g., a class indicating that the particular historical records are associated with particular issues).

Additionally, or alternatively, the testing platform can train the machine learning model using a supervised training procedure that includes receiving input to the model from a subject matter expert, which can reduce an amount of time, an amount of processing resources, and/or the like to train the machine learning model, relative to an unsupervised training procedure. In some implementations, the testing platform can use one or more other model training techniques, such as a neural network technique, a latent semantic indexing technique, and/or the like. For example, the testing platform can perform an artificial neural network processing technique (e.g., using a two-layer feedforward neural network architecture, a three-layer feedforward neural network architecture, and/or the like) to perform pattern recognition with regard to patterns of particular historical records that are associated with particular issues. In this case, using the artificial neural network processing technique can improve an accuracy of the machine learning model generated by the testing platform by being more robust to noisy, imprecise, or incomplete data, and by enabling the testing platform to detect patterns and/or trends undetectable to human analysts or systems using less complex techniques.

Accordingly, the testing platform can use any number of artificial intelligence techniques, machine learning techniques, deep learning techniques, and/or the like to determine and/or identify an issue concerning an MRFP, an MRFC, at least one network device, and/or the like.

As shown by reference number 118, the testing platform can perform a corrective action. In some implementations, the testing platform can perform, based on determining and/or identifying the issue concerning the MRFP, the MRFC, the at least one network device, and/or the like, an action to address the issue. In some implementations, the action can concern the MRFP, the MRFC, the at least one network device, and/or the like. In some implementations, the action can include causing the MRFP, the MRFC, the at least one network device, and/or the like to be disconnected from the network. This improves the operation of the network by physically removing the MRFP, the MRFC, the at least one network device, and/or the like from negatively impacting the network. In some implementations, the action can include causing audio data to be diverted around the MRFP, the MRFC, the at least one network device, and/or the like. This improves the operation of the network by functionally removing the MRFP, the MRFC, the at least one network device, and/or the like from negatively impacting the network. This also improves the operation of the network by increasing voice communication session traffic to devices that are performing well and by reducing voice communication session traffic to devices that are not performing well.

In some implementations, the action can include determining a set of instructions to correct the issue. In some implementations, the testing platform can execute the set of instructions to correct the issue (e.g., cause the MRFP, the MRFC, the at least one network device, and/or the like to be disconnected from the network, cause audio data to be diverted around the MRFP, the MRFC, the at least one network device, and/or the like). This improves the operation of the network by physically, functionally, and/or the like removing the MRFP, the MRFC, the at least one network device, and/or the like from negatively impacting the network. This also reduces the need for a technician to physically service the MRFP, the MRFC, the at least one network device, and/or the like, which reduces the amount of service technicians that are needed to maintain the network, which reduces costs associated with maintaining the network. In some implementations, the testing platform can generate a message that includes the set of instructions and information that identifies the issue and/or the MRFP, the MRFC, the at least one network device, and/or the like. In some implementations, the testing platform can send the message to a remote device (e.g., a user device of a service technician). In some implementations, the remote device can display the set of instructions and the information that identifies the issue and/or the MRFP, the MRFC, the at least one network device, and/or the like. In this way, the service technician that uses the remote device has information to efficiently address the issue without having to run diagnostic tests on the MRFP, the MRFC, the at least one network device, and/or the like. This can reduce the amount of time that the service technician has to spend on servicing the MRFP, the MRFC, the at least one network device, and/or the like, which can reduce costs associated with maintaining the network.

In some implementations, the action can include running a diagnostic test on the MRFP, the MRFC, the at least one network device, and/or the like. For example, the testing platform can isolate an individual element of the MRFP, the MRFC, the at least one network device, and/or the like, and perform tests on the individual element (e.g., send signals, SIP messages, audio data, and/or the like to the individual element) to identify or determine one or more issues concerning the individual element. In some implementations, the individual element can include an audio codec, a voice card, an Ethernet voice port, a SIP signaling port, and/or the like. In some implementations, the testing platform can cause, based on identifying/determining the one or more issues concerning the individual element, the individual element and/or the MRFP, the MRFC, the at least one network device, and/or the like to be serviced. In this way, the testing platform can automatically diagnose and address the issue. This can reduce the amount of time that the service technician has to spend on servicing the MRFP, the MRFC, the at least one network device, and/or the like, which can reduce costs associated with maintaining the network.

In some implementations, the testing platform can send information identifying the issue to an additional device (e.g., a user device configured to run diagnostics on an MRFP, an MRFC, at least one network device, and/or the like). In some implementations, the additional device, based on the information identifying the issue, can run the diagnostic test on the MRFP, the MRFC, the at least one network device, and/or the like and send a diagnostic report to the testing platform. In some implementations, the testing platform can cause, based on the diagnostic report, the MRFP, the MRFC, the at least one network device, and/or the like to be serviced. This can reduce the amount of time that the MRFP, the MRFC, the at least one network device, and/or the like needs to be serviced, which can reduce the need for redundant MRFPs, MRFCs, network devices, and/or the like in the network, which can reduce maintenance costs associated with servicing the redundant MRFPs, MRFCs, network devices, and/or the like in the network.

As indicated above, FIGS. 1A-1C are provided merely as an example. Other examples can differ from what is described with regard to FIGS. 1A-1C.

Figure 2:
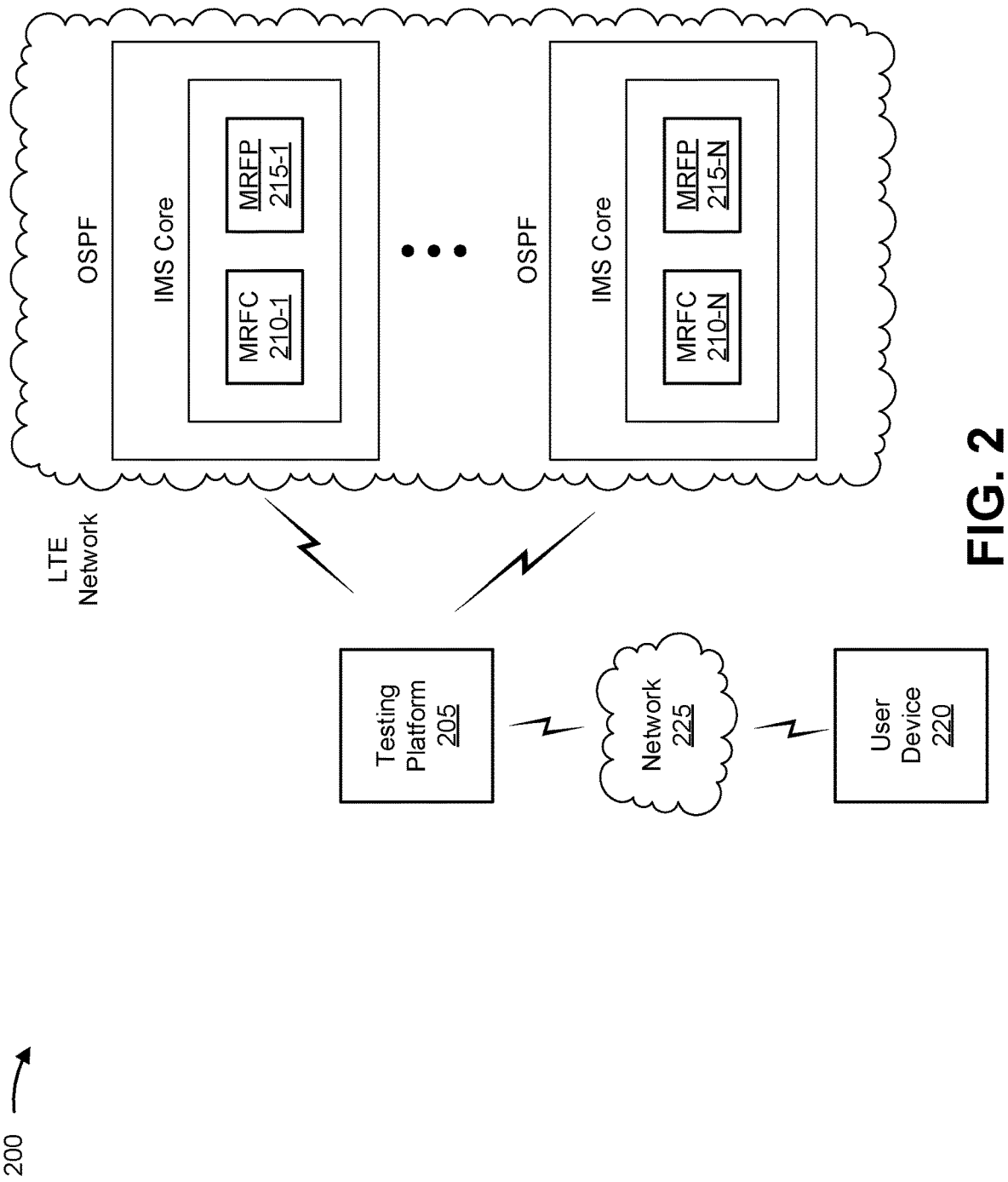
FIG. 2 is a diagram of an example environment in which systems and/or methods described herein can be implemented.

FIG. 2 is a diagram of an example environment 200 in which systems and/or methods, described herein can be implemented. As shown in FIG. 2, environment 200 can include a testing platform 205, one or more media resource function controller (MRFCs) 210-1 through 210-N(N≥1) (hereinafter referred to collectively as "MRFCs 210" and individually as "MRFC 210"), one or more media resource function processors (MRFPs) 215-1 through 215-N(N≥1) (hereinafter referred to collectively as "MRFPs 215" and individually as "MRFP 215"), a user device 220, and a network 225. Devices of environment 200 can interconnect via wired connections, wireless connections, or a combination of wired and wireless connections.

Some implementations are described herein, for explanatory purposes, as being performed within a Long-Term Evolution (LTE) network. Some implementations can be performed within a network that is not an LTE network, such as a 3G network, a 4G network, a new radio (NR) network, or a 5G network. With a 5G network, one or more of the devices and/or functions described herein can be virtualized and performed within a cloud computing environment and/or by one or more devices different from those described herein.

Environment 200 can include an evolved packet system (EPS) that includes an LTE network based on a third generation partnership project (3GPP) wireless communication standard. The LTE network can be divided into one or more open shortest path first (OSPF) areas. Each OSPF area can include an Internet protocol (IP) multimedia subsystem (IMS) core. Each IMS core can include an MRFC 210 and an MRFP 215. Each IMS core can facilitate initiating, maintaining, and/or terminating a voice communication session.

Testing platform 205 can include one or more devices capable of receiving, storing, providing, generating, and/or processing audio data associated with MRFP 215 and/or MRFC 210. For example, testing platform 205 can include a server device or a group of server devices, a workstation computer or a group of workstation computers, a virtual machine (VM) or a group of virtual machines (VMs) implemented by one or more computing devices provided in a cloud computing environment, and/or a similar type or group of devices. In some implementations, testing platform 205 can provide first audio data to MRFP 215 via network devices of an LTE network and can receive second audio data from MRFP 215 via the network devices of the LTE network.

MRFC 210 can include one or more devices, such as one or more server devices, capable of controlling MRFP 215. MRFC 210 can be part of a control layer of the IMS core and can be capable of receiving, storing, and/or processing session initiation protocol (SIP) messages. In some implementations, MRFC 210 can process an SIP message to cause MRFP 215 to initiate a voice communication session and/or convert audio data.

MRFP 215 can include one or more devices, such as one or more server devices, capable of processing media streams, such as audio streams, and converting and/or transcoding multimedia data, such as audio data. MRFP 215 can be part of an application layer of the IMS core and can be capable of receiving, storing, processing, and/or sending audio data via a voice communication session. MRFP 215 can include a digital signal processor (DSP) to process audio data, such as converting first audio data that conforms to a first voice protocol into second audio data that conforms to a second voice protocol.

User device 220 can include one or more devices capable of receiving, generating, storing, processing, and/or providing information associated with performing an action to address an issue concerning MRFC 210, MRFP 215, a network device, and/or the like. For example, user device 220 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), and/or a similar type of device.

Network 225 can include one or more wired and/or wireless networks. For example, network 225 can include a cellular network (e.g., an LTE network, a 3G network, a code division multiple access (CDMA) network, a 4G network, a new radio (NR) network, a 5G network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
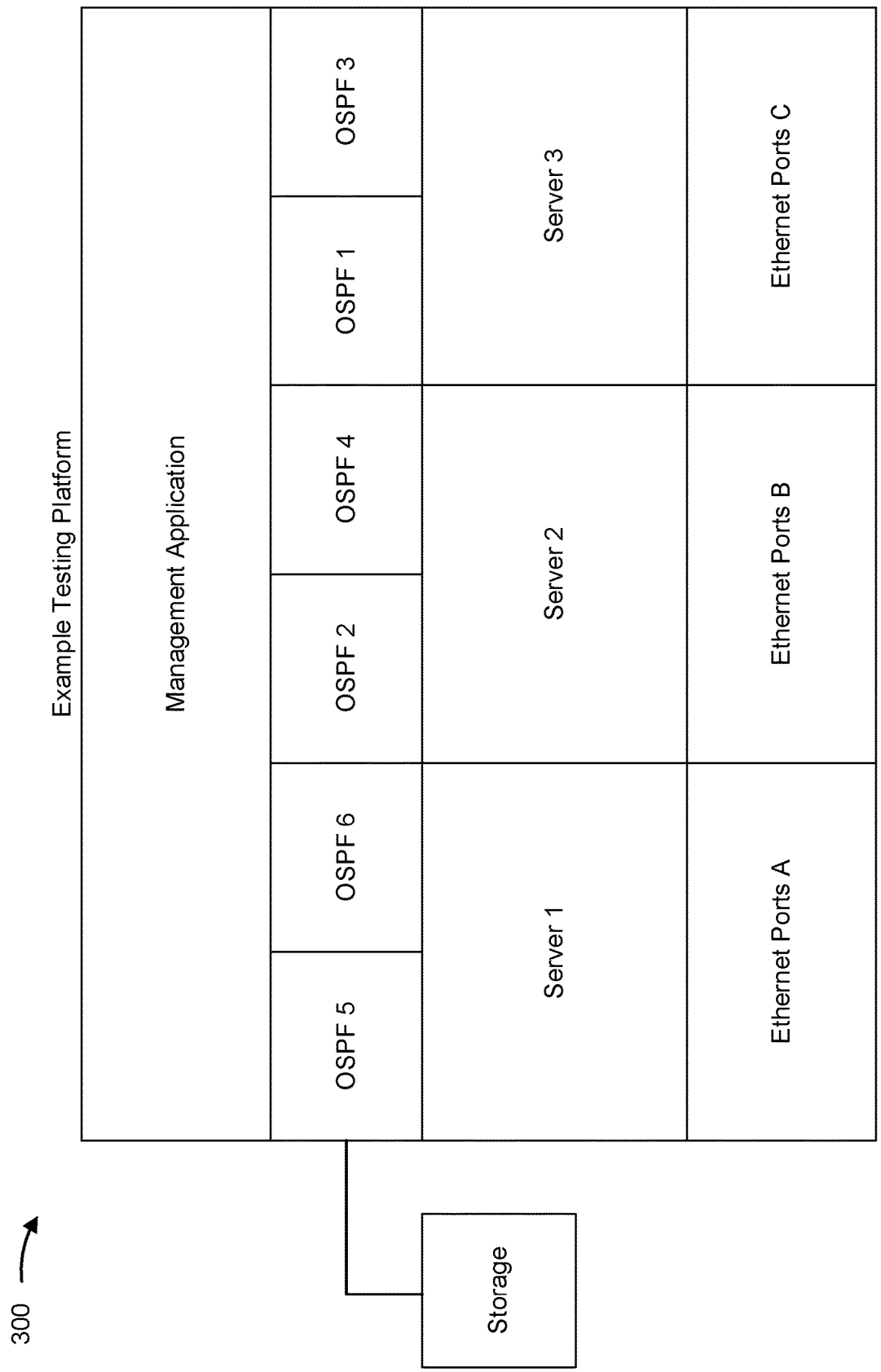
FIG. 3 is a diagram of an example testing platform described herein.

FIG. 3 is a functional diagram of an example testing platform 300 in which systems and/or methods described herein can be implemented. In some implementations, the example testing platform 300 can be implemented by a group of server devices capable of initiating a plurality of voice communication sessions with a media resource function processor (MRFP) of a network to identify an issue concerning at least one network device of the network. As shown in FIG. 3, example testing platform 300 can include a management application that creates, maintains, manages, schedules, and/or the like scripts for initiating voice communication sessions to test one or more network devices of the network. In some implementations, example testing platform 300 can include multiple server instances, where each server instance is dedicated to initiating voice communication sessions to service a particular open shortest path first (OSPF) area. For example, as shown in FIG. 3, example testing platform 300 includes three server instances (shown as Server 1, Server 2, and Server 3), where each server instance is dedicated to initiating voice communication sessions for two particular OSPF areas (e.g., Server 1 is associated with OSPFs 5 and 6, Server 2 is associated with OSPFs 2 and 4, and Server 3 is associated with OSPFs 1 and 3). In some implementations, each server instance can utilize a plurality of Ethernet ports of example testing platform 300. For example, as shown in FIG. 3, each server instance of example testing platform 300 uses a set of Ethernet ports to communicate data via the plurality of voice communication sessions (e.g., Server 1 is associated with Ethernet Ports A, Server 2 is associated with Ethernet Ports B, Server 3 is associated with Ethernet Ports C).

The number and arrangement of functional elements shown in FIG. 3 are provided as an example. In practice, example testing platform 300 can include additional functional elements, fewer functional elements, different functional elements, or differently arranged functional elements than those shown in FIG. 3. Additionally, or alternatively, a set of functional elements (e.g., one or more functional elements) of example testing platform 300 can perform one or more functions described as being performed by another set of functional elements of example testing platform 300.

Figure 4:
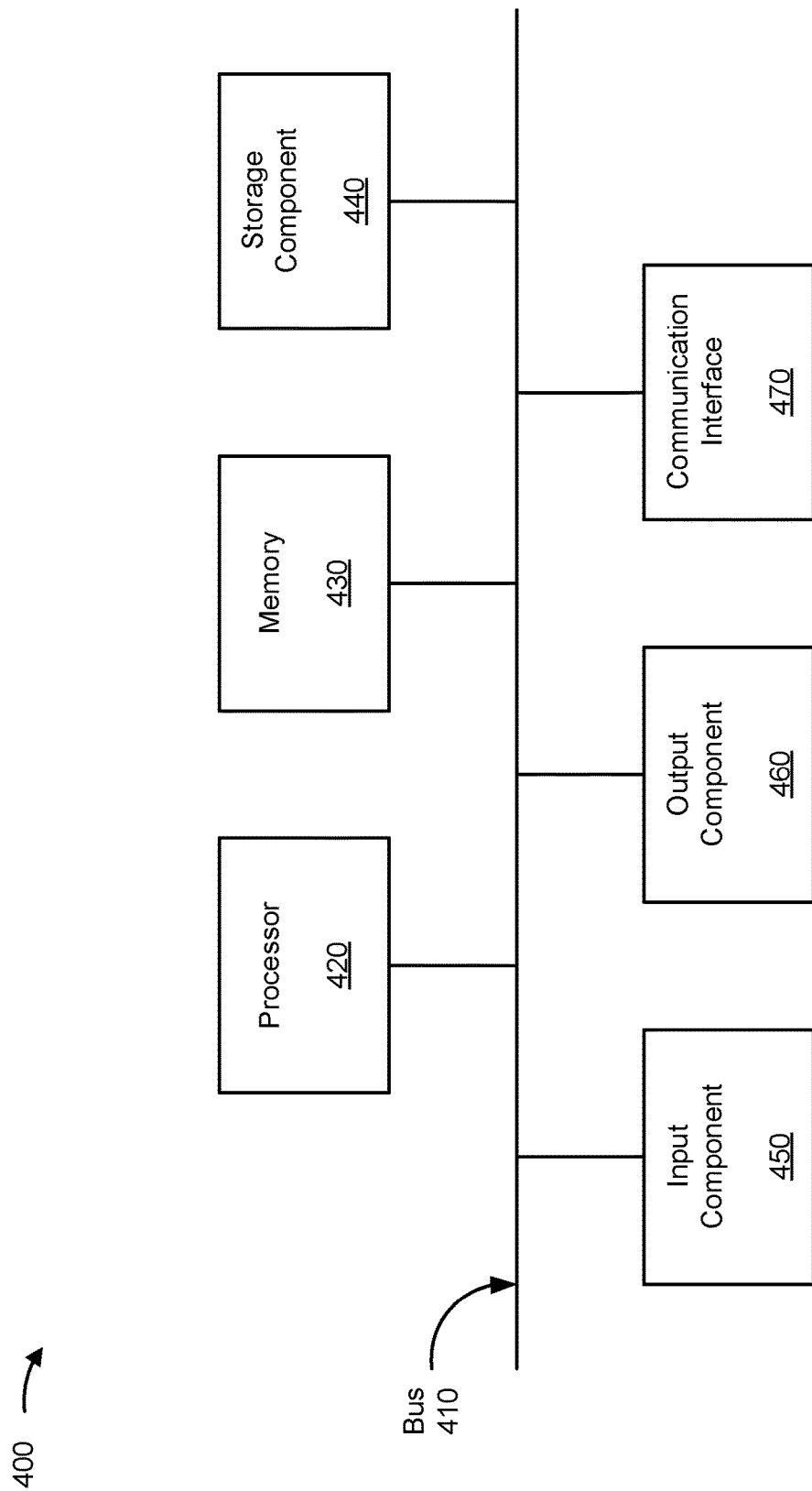
FIG. 4 is a diagram of example components of one or more devices of FIG. 2.

FIG. 4 is a diagram of example components of a device 400. Device 400 can correspond to testing platform 205, MRFC 210, MRFP 215, and/or user device 220. In some implementations testing platform 205, MRFC 210, MRFP 215, and/or user device 220 can include one or more devices 400 and/or one or more components of device 400. As shown in FIG. 4, device 400 can include a bus 410, a processor 420, a memory 430, a storage component 440, an input component 450, an output component 460, and/or a communication interface 470.

Bus 410 includes a component that permits communication among multiple components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a wireless local area network interface, a cellular network interface, or the like.

Device 400 can perform one or more processes described herein. Device 400 can perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

Figure 5:
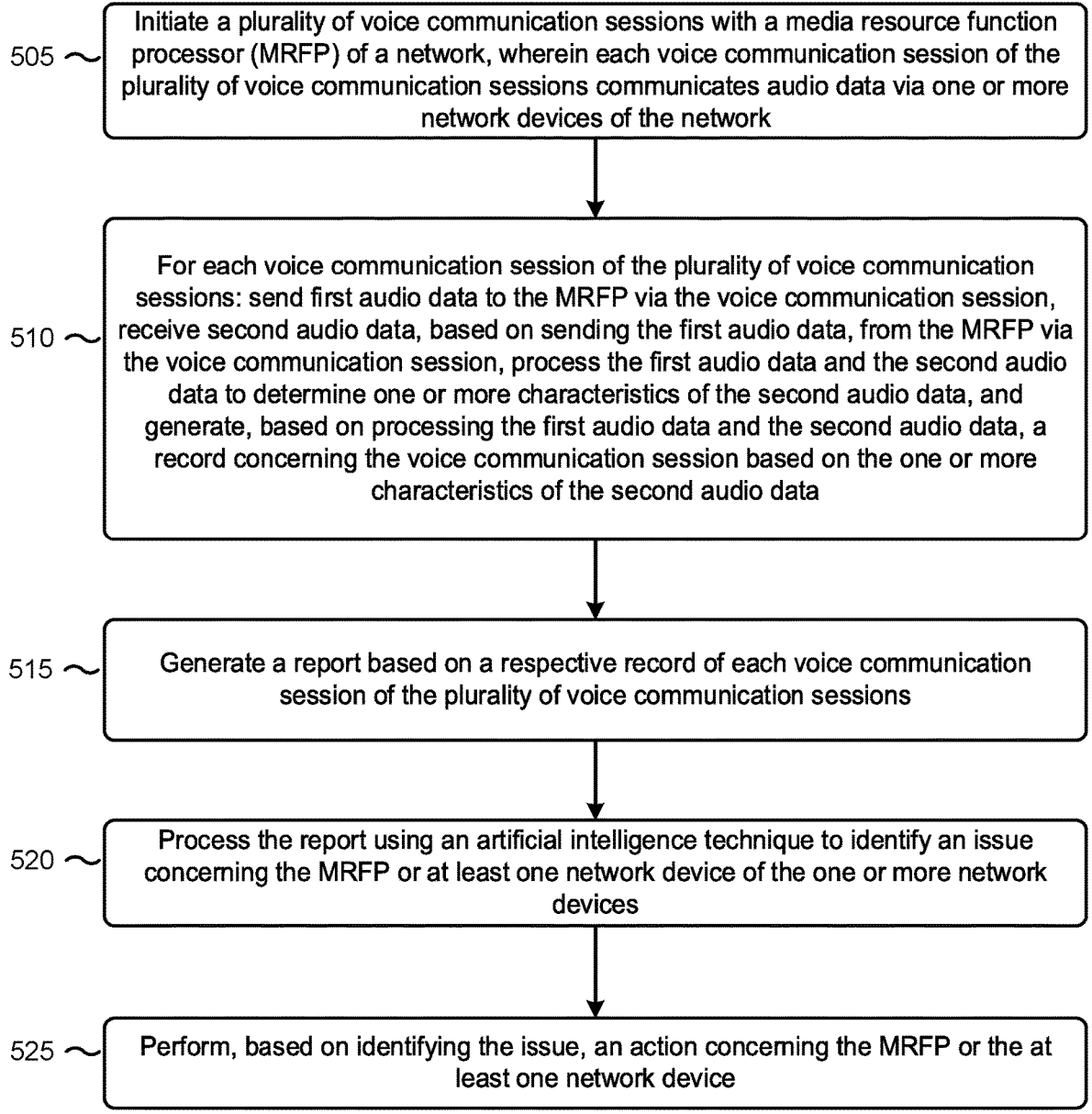
FIG. 5 is a flow chart of an example process for an automated network voice testing platform.

FIG. 5 is a flow chart of an example process 500 for an automated network voice testing platform. In some implementations, one or more process blocks of FIG. 5 can be performed by a testing platform (e.g., testing platform 205). In some implementations, one or more process blocks of FIG. 5 can be performed by another device or a group of devices separate from or including the testing platform, such as an MRFC (e.g., MRFC 210), an MRFP (e.g., MRFP 215), and/or a user device (e.g., user device 220).

As shown in FIG. 5, process 500 can include initiating a plurality of voice communication sessions with a media resource function processor (MRFP) of a network, wherein each voice communication session of the plurality of voice communication sessions communicates audio data via one or more network devices of the network (block 505). For example, the testing platform (e.g., using processor 420, memory 430, storage component 440, communication interface 470, and/or the like) can initiate a plurality of voice communication sessions with an MRFP of a network, as described above. In some implementations, each voice communication session of the plurality of voice communication sessions can communicate audio data via one or more network devices of the network.

As further shown in FIG. 5, process 500 can include, for each voice communication session of the plurality of voice communication sessions, sending first audio data to the MRFP via the voice communication session, receiving second audio data, based on sending the first audio data, from the MRFP via the voice communication session, processing the first audio data and the second audio data to determine one or more characteristics of the second audio data, and generating, based on processing the first audio data and the second audio data, a record concerning the voice communication session based on the one or more characteristics of the second audio data (block 510). For example, the testing platform (e.g., using processor 420, memory 430, storage component 440, input component 450, output component 460, communication interface 470, and/or the like) can, for each voice communication session of the plurality of voice communication sessions, send first audio data to the MRFP via the voice communication session, receive second audio data, based on sending the first audio data, from the MRFP via the voice communication session, process the first audio data and the second audio data to determine one or more characteristics of the second audio data, and generate, based on processing the first audio data and the second audio data, a record concerning the voice communication session based on the one or more characteristics of the second audio data, as described above.

As further shown in FIG. 5, process 500 can include generating a report based on a respective record of each voice communication session of the plurality of voice communication sessions (block 515). For example, the testing platform (e.g., using processor 420, memory 430, storage component 440, and/or the like) can generate a report based on a respective record of each voice communication session of the plurality of voice communication sessions, as described above.

As further shown in FIG. 5, process 500 can include processing the report using an artificial intelligence technique to identify an issue concerning the MRFP or at least one network device (block 520). For example, the testing platform (e.g., using processor 420, memory 430, storage component 440, and/or the like) can process the report using an artificial intelligence technique to identify an issue concerning the MRFP or at least one network device, as described above.

As further shown in FIG. 5, process 500 can include performing, based on identifying the issue, an action concerning the MRFP or the at least one network device (block 525). For example, the testing platform (e.g., using processor 420, memory 430, storage component 440, input component 450, output component 460, communication interface 470, and/or the like) can perform, based on identifying the issue, an action concerning the MRFP or the at least one network device, as described above.

Process 500 can include additional implementations, such as any single implementation or any combination of implementations described below and/or in connection with one or more other processes described elsewhere herein.

In some implementations, the one or more characteristics of the second audio data can include a packet loss performance of the second audio data, a jitter of the second audio data, a mean opinion score (MOS) of the second audio data, a latency of the second audio data, and/or a wave form deviation of the second audio data. In some implementations, the first audio data can conform to a first voice protocol and the second audio data can conform to a second voice protocol.

In some implementations, when initiating the plurality of voice communication sessions with the MRFP of the network, the testing platform can determine a maximum number of voice communication sessions with the MRFP that can be established in a period of time, can determine a maximum bandwidth allotment for voice communication sessions with the MRFP for the period of time, can determine a number of the plurality of voice communication sessions to initiate during the period of time based on the maximum number of voice communication sessions and the maximum bandwidth allotment, and can initiate, based on determining the number of the plurality of voice communication sessions to initiate during the period of time, the plurality of voice communication sessions with the MRFP during the period of time.

In some implementations, when performing the action concerning the MRFP or the at least one network device, the testing platform can determine a set of instructions to correct the issue, can generate a message that includes the set of instructions and information that identifies the issue and the MRFP or the at least one network device, and can send the message to a remote device having a display, where sending the message to the remote device causes the remote device to display the set of instructions and the information that identifies the issue and the MRFP or the at least one network device. In some implementations, when performing, based on identifying the issue, the action concerning the MRFP or the at least one network device, the testing platform can cause the MRFP and/or the at least one network device to be disconnected from the network, and/or can cause audio data to be diverted around the MRFP or the at least one network device.

In some implementations, when performing, based on identifying the issue, the action concerning the MRFP or the at least one network device, the testing platform can send information identifying the issue to an additional device, where the information identifying the issue causes the additional device to run a diagnostic test on the MRFP or the at least one network device, can receive, from the additional device and based on sending the information identifying the issue to the additional device, a diagnostic report concerning the MRFP or the at least one network device, and can cause, based on the diagnostic report, the MRFP or the at least one network device to be serviced.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   transmitting, by a device, first audio data;
   receiving, by the device and based on transmitting the first audio data, second audio data;
   processing, by the device and based on receiving the second audio data, the second audio data to determine one or more characteristics of the second audio data;
   generating, by the device, a record based on the one or more characteristics of the second audio data;
   determining, by the device and based on generating the record, an issue concerning one or more of:
      a media resource function controller (MRFC) of a network,
      a media resource function processor (MRFP) of the network, or
      at least one network device of the network; and
   performing, by the device and based on determining the issue, a corrective action to address the issue,
      the corrective action including or more of:
         causing one or more of the MRFC, the MRFP, or the at least one network device to be disconnected from the network,
         causing third audio data to be diverted around one or more of the MRFC, the MRFP, or the at least one network device, or
         running a diagnostic test on one or more of the MRFC, the MRFP, or the at least one network device.

2. The method of claim 1, wherein running the diagnostic test comprises:
   isolating an individual element of the MRFC, the MRFP, or the at least one network device, and
   performing one or more tests on the individual element.

3. The method of claim 2, wherein performing the one or more tests on the individual element comprises:
   sending one or more of a signal, a message, or fourth audio data to the individual element.

4. The method of claim 2, wherein the individual element comprises:
   an audio codec,
   a voice card,
   a voice port, or
   a signaling port.

5. The method of claim 1, further comprising:
   processing historical records associated with historical reports to generate and/or train a machine learning model; and
   wherein determining the issue comprises:
      determining the issue using the machine learning model.

6. The method of claim 1, wherein determining the issue comprises:
   determining the issue using one or more of:
      an artificial intelligence technique,
      a machine learning model technique, or
      a deep learning technique.

7. The method of claim 1, wherein the one or more characteristics of the second audio data comprises one or more of:
   a packet loss performance value of the second audio data,
   a jitter value of the second audio data,
   a mean opinion score (MOS) of the second audio data,
   a latency identifier of the second audio data, or
   a wave form deviation value of the second audio data.

8. A device, comprising:
one or more processors configured to:
transmit first audio data;
receive, based on transmitting the first audio data, second audio data;
process the second audio data to determine one or more characteristics of the second audio data;
generate a record based on the one or more characteristics of the second audio data;
determine, based on generating the record, an issue concerning one or more of:
a media resource function controller (MRFC) of a network,
a media resource function processor (MRFP) of the network, or
at least one network device of the network; and
perform, based on determining the issue, a corrective action to address the issue,
wherein the one or more processors, when performing the corrective action, are configured to at least one of:
cause one or more of the MRFC, the MRFP, or the at least one network device to be disconnected from the network,
cause third audio data to be diverted around one or more of the MRFC, the MRFP, or the at least one network device, or
run a diagnostic test on one or more of the MRFC, the MRFP, or the at least one network device.

9. The device of claim 8, wherein the one or more characteristics of the second audio data comprises a packet loss performance value of the second audio data; and
wherein the one or more processors, when determining the one or more characteristics of the second audio data, are configured to:
determine that a percentage or quantity of packets of the second audio data are missing based on comparing the second audio data and the first audio data.

10. The device of claim 8, wherein the one or more processors, when determining the issue, are configured to:
determine a one way audio error based on one or more packets of the second audio data being empty.

11. The device of claim 8, wherein the one or more processors, when generating the record, are configured to:
generate a record concerning a voice communication session associated with the second audio data.

12. The device of claim 8, wherein the first audio data is associated with a voice communication session.

13. The device of claim 8, wherein the second audio data is received based on the first audio data being transcoded and/or converted to the second audio data.

14. The device of claim 8, wherein the one or more processors are further configured to:
send a session initiation protocol (SIP) conversion signal to the MRFC to cause the MRFP to convert and/or transcode the first audio data into the second audio data.

15. A non-transitory computer-readable medium storing a set of instructions, the set of instructions comprising:
one or more instructions that, when executed by one or more processors of a device, cause the device to:
transmit first audio data;
receive, based on transmitting the first audio data, second audio data;
process the second audio data to determine one or more characteristics of the second audio data;
generate a record based on the one or more characteristics of the second audio data;
determine, based on generating the record, an issue concerning one or more of:
a media resource function controller (MRFC) of a network,
a media resource function processor (MRFP) of the network, or at least one network device of the network; and
perform, based on determining the issue, a corrective action to cause at least one of:
one or more of the MRFC, the MRFP, or the at least one network device to be disconnected from the network,
third audio data to be diverted around one or more of the MRFC, the MRFP, or the at least one network device, or
a diagnostic test to be run on one or more of the MRFC, the MRFP, or the at least one network device.

16. The non-transitory computer-readable medium of claim 15, wherein the one or more instructions further cause the device to:
initiate a voice communication session with the MRFP; and
wherein the one or more instructions, that cause the device to process the second audio data, cause the device to:
process the second audio data based on initiating the voice communication session.

17. The non-transitory computer-readable medium of claim 16, wherein the one or more instructions further cause the device to:
emulate one or more devices of the network; and
wherein the one or more instructions, that cause the device to initiate the voice communication session, cause the device to:
initiate the voice communication session based on emulating the one or more devices of the network.

18. The non-transitory computer-readable medium of claim 16, wherein the one or more instructions, that cause the device to initiate the voice communication session, cause the device to:
send a session initiation protocol (SIP) message to the MRFC.

19. The non-transitory computer-readable medium of claim 16, wherein the one or more instructions further cause the device to:
determine a topology of the network; and
wherein the one or more instructions, that cause the device to initiate the voice communication session, cause the device to:
determine and/or generate a script to initiate the voice communication session based on determining the topology of the network.

20. The non-transitory computer-readable medium of claim 19, wherein the one or more instructions further cause the device to:
run the script on a scheduled basis.

* * * * *